US012798764B2

(12) United States Patent
Kucuk et al.

(10) Patent No.: US 12,798,764 B2
(45) Date of Patent: Nov. 17, 2026

(54) AERODYNAMIC DIVERTER

(71) Applicants: Tusas-Turk Havacilik Ve Uzay Sanayii Anonim Sirketi, Kahramankazan (TR); ODTÜ Strateji Geliştirme Daire Başkanliği, Çankaya (TR)

(72) Inventors: Umut Can Kucuk, Kahramankazan (TR); Ismail Hakki Tuncer, Çankaya (TR)

(73) Assignees: Tusas- Turk Havacilik Ve Uzay Sanayii Anonim Sirketi, Kahramankazan (TR); ODTÜ Strateji Geliştirme Daire Başkanliği, Çankaya (TR)

( * ) Notice: Subject to any disclaimer, the term of this patent is extended or adjusted under 35 U.S.C. 154(b) by 0 days.

(21) Appl. No.: 19/081,084

(22) Filed: Mar. 17, 2025

(65) Prior Publication Data

US 2025/0289576 A1 Sep. 18, 2025

(30) Foreign Application Priority Data

Mar. 15, 2024 (TR) ................................ 2024/003173

(51) Int. Cl.
*B64C 21/02* (2006.01)
*B64D 33/02* (2006.01)

(52) U.S. Cl.
CPC .......... *B64C 21/02* (2013.01); *B64C 2230/08* (2013.01); *B64D 2033/0226* (2013.01)

(58) Field of Classification Search
CPC ....... B64C 21/025; B64C 21/06; B64C 21/02; B64C 2230/08; B64D 2033/0226; B64D 2241/00
See application file for complete search history.

(56) References Cited

U.S. PATENT DOCUMENTS 4,174,083 A * 11/1979 Mohn .................... B64D 33/02 137/15.1
4,378,097 A * 3/1983 Ferguson ............... B64D 33/02 137/15.1
5,490,644 A * 2/1996 Koncsek ............... B64C 21/025 244/209
5,517,865 A * 5/1996 Wisler ................... B64D 43/00 73/863.41
5,598,990 A 2/1997 Farokhi et al.
8,398,016 B2 * 3/2013 Porte ...................... B64D 33/08 137/15.1

(Continued)

FOREIGN PATENT DOCUMENTS

CN 111173618 A * 5/2020 ................ F02C 7/04
CN 116080913 A * 5/2023 ............. B64D 33/02

(Continued)

*Primary Examiner* — Joseph W Sanderson

(57) ABSTRACT

The invention relates to at least one surface (2) exposed to the air flow (AF), at least one cavity (3) that is located in a way that creates an opening in the form of a recess on the surface (2), at least one inlet (4) that is located on the cavity (3) and first meets the incoming air flow (AF), at least one outlet (5) where the air flow (AF) leaves the cavity (3), and at least one aerodynamic element (P) that is located on the surface (2) and is exposed to the air flow (AF).

13 Claims, 3 Drawing Sheets

(56) References Cited

U.S. PATENT DOCUMENTS

| | | | | |
|---|---|---|---|---|
| 8,528,601 | B2 * | 9/2013 | Dahm | F02C 7/04 137/809 |
| 9,862,482 | B2 * | 1/2018 | Huynh | B64C 21/08 |
| 9,976,480 | B2 * | 5/2018 | Prouteau | B60K 11/08 |
| 10,723,474 | B2 * | 7/2020 | Lauder | B64C 21/08 |
| 11,312,499 | B2 * | 4/2022 | Maple | B64D 33/02 |
| 11,584,514 | B2 * | 2/2023 | Heuer | B64C 21/02 |
| 2010/0288379 | A1 * | 11/2010 | Dahm | F02C 7/04 137/561 R |
| 2011/0253843 | A1 * | 10/2011 | Porte | B64D 33/08 244/53 B |
| 2013/0072100 | A1 * | 3/2013 | Bosman | B64D 13/00 454/76 |
| 2015/0167552 | A1 * | 6/2015 | Prouteau | B64D 13/00 137/15.1 |
| 2016/0031550 | A1 | 2/2016 | Harrison et al. | |
| 2017/0066527 | A1 * | 3/2017 | Huynh | B64C 21/08 |
| 2018/0339784 | A1 * | 11/2018 | Lauder | B64C 21/10 |
| 2019/0283861 | A1 * | 9/2019 | Maple | B64C 21/00 |
| 2020/0369376 | A1 * | 11/2020 | Heuer | B64C 21/08 |
| 2025/0108929 | A1 * | 4/2025 | Basala | B64D 33/02 |

FOREIGN PATENT DOCUMENTS

| | | | | | |
|---|---|---|---|---|---|
| DE | 102020103784 | A1 | * | 8/2021 | B64D 29/00 |
| FR | 3014846 | A1 | * | 6/2015 | B64D 33/02 |
| WO | WO-2012049500 | A1 | * | 4/2012 | F02M 35/10 |

* cited by examiner

AERODYNAMIC DIVERTER

RELATED APPLICATION

This application claims the benefit of priority of Turkey Patent Application No. 2024/003173 filed on Mar. 15, 2024, the contents of which are incorporated by reference as if fully set forth herein in their entirety.

FIELD AND BACKGROUND OF THE INVENTION

This invention relates to a structure that ensures the divergence of the air flow formed on the surface.

A boundary layer, around which viscous forces are formed, develops around the surface of every fixed solid object with fluid passing around it or every solid object moving in a fluid. The speed is assumed to be zero due to the condition that the fluid does not slip at the point where it contacts a solid surface, and the speed of the fluid increases as the flow moves away from the surface of the solid object due to the effect of the profile. The region between the point where the fluid's speed is zero and the point where it reaches the free stream speed is called the boundary layer. During high-speed flight, a very low-speed, low-total-pressure boundary air layer is formed on the body of the aircraft. Since said low-energy air will cause low motor performance, aircraft operating with air-breathing motors traditionally use a type of boundary layer diverter system to prevent the boundary layer air from entering the air intake. The boundary layer diverter is usually a gap or step that is located between the side of the aircraft body and the inlet that directs the low pressure boundary layer air formed on the aircraft body and prevents said boundary layer air from entering the motor air intake.

In the U.S. Pat. No. 5,598,990A in the state of the art, a supersonic vortex generator for structures exposed to supersonic airflow that normally results in flow separation, wave drag and other interferences with the airflow, to reduce this flow separation, induced drag and airflow disruption is disclosed. Said invention comprises a vortex generator that comprises a gap in an aerodynamic profile or other surfaces on which supersonic air flows and can initially create a series of different points and then create spiral vortices in the direction of the flow following the gaps that serve to reduce flow separation and wave drag.

The United States patent document numbered US20160031550A1 in the state of the art mentions the inclusion of a vortex generator embedded in the aerodynamic body. The embedded vortex generator causes a depression on the aerodynamic surface.

With the help of an aerodynamic diverter developed with the present invention, the separation of the boundary layer from the aerodynamic element is effectively carried out.

Another aim of the invention is to provide low drag force by means of the aerodynamic diverter embedded in the surface.

Another aim of the invention is to contribute to the low visibility of the aircraft by means of the embedded structure on the surface.

Another aim of the invention is to provide an efficient diverter in transonic aircraft groups.

SUMMARY OF THE INVENTION

The aerodynamic diverter defined in the first claim and the claims dependent on this claim, which is realised to achieve the aim of the invention, comprises at least one surface that is exposed to air flow. It comprises at least one cavity on the surface in a way that creates an opening from the surface inward. There is at least one inlet on the cavity that faces the incoming air flow. The air flow exits the cavity through the outlet that is located on the cavity. There is at least one aerodynamic element that is exposed to the air flow on the surface.

The aerodynamic diverter, which is the subject of the invention, has the inlet and outlet opposite each other. The guiding surface is located on the outlet and extends from the outlet to the inlet. The aerodynamic element is located behind the outlet relative to the direction of the air flow. The air flow passing over the guiding surface is transmitted to the aerodynamic element. The guiding surface ensures that the air flow exits the cavity by directing the air entering the cavity from the inlet around the aerodynamic element.

Optionally, the aerodynamic diverter comprises at least one base forming the floor of the cavity. The base extends from the inlet to the inside of the surface at a slope predetermined by the manufacturer. In this way, the air flow entering from the inlet is directed between the base and the guiding surface to the outlet.

Optionally, the aerodynamic diverter comprises at least one rear wall extending from the base to the outlet at a slope predetermined by the manufacturer. The pressure wall extends from the rear wall to the guiding surface at a slope predetermined by the manufacturer. In this way, the air flow entering from the inlet is compressed between the base and the guiding surface, creating a high static pressure region.

Optionally, the aerodynamic diverter comprises at least two side walls extending with an incline from the base to the surface. In this way, the air flow entering from the inlet is ensured to exit the cavity from the outlet in a way that noise generation is almost completely prevented.

Optionally, the aerodynamic diverter is located almost in the middle of the outlet in such a way that the guiding surface is opposite the inlet surface. The guiding channels are located in a way that creates an opening between the guiding surface and the side walls. The guiding surface is located in the middle of the guiding channels. By means of the guiding channels, the air flow exiting the cavity is distributed homogeneously to the right and left of the aerodynamic element.

Optionally, the aerodynamic diverter is located in such a way that the outlet has a larger cross-section than the inlet. The guiding surface has a larger cross-section than the inlet and extends from the outlet towards the cavity in a way that its cross-section narrows. In this way, it directs the air flow entering from the inlet to the guiding channels in a way that does not disrupt the symmetry.

Optionally, the aerodynamic diverter comprises at least one intermediate wall extending from the pressure wall to the direction surface at a slope predetermined by the manufacturer. By means of the intermediate wall, the air flow entering from the inlet is directed to the guiding channels.

Optionally, the aerodynamic diverter comprises a cavity extending from the inlet to the outlet in a way that it widens. In this way, the air flow is directed to the sides of the aerodynamic element through the guiding channels and almost completely prevented from contacting said element.

Optionally, the aerodynamic diverter comprises a base with a gradually decreasing slope at different slopes from the inlet to the outlet.

Optionally, the aerodynamic diverter comprises a cavity that is almost V-shaped when viewed as the inlet, outlet and aerodynamic element, respectively.

Optionally, the aerodynamic diverter comprises an aerodynamic element that is located on the aircraft.

Optionally, the aerodynamic diverter comprises a surface that is the aircraft.

Optionally, the aerodynamic diverter comprises at least one channel that creates an opening on the surface of the aerodynamic element facing the aerodynamic diverter. The cavity is placed in a way that there is a distance between it and the channel and ensures that the air flow passing over the cavity enters through the channel. It ensures that the air flow entering the cavity goes around the aerodynamic element. There is at least one motor fed by the air passing through the aerodynamic element.

Optionally, the aerodynamic diverter comprises an aerodynamic element with an air intake. The cavity is placed in front of the air intake by the manufacturer with a distance between them. In this way, the aerodynamic diverter ensures that the air flow entering from the inlet is removed from the air intake.

BRIEF DESCRIPTION OF THE SEVERAL VIEWS OF THE DRAWINGS

The aerodynamic diverter realised to achieve the aim of this invention is shown in the attached figures, and of these figures.

Figure 1:
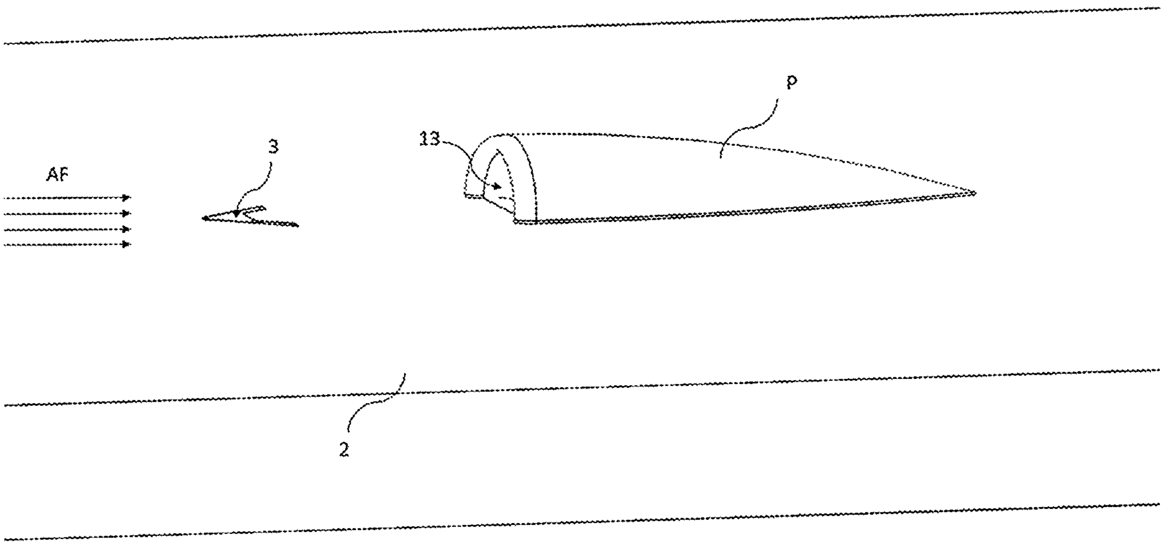
FIG. 1—Schematic view of the aerodynamic element, cavity, surface and air flow.

The parts in the figures are numbered one by one and the equivalents of these numbers are given below.

1. Aerodynamic diverter
2. Surface
3. Cavity
4. Inlet
5. Outlet
6. Guiding surface
7. Base
8. Rear wall
9. Pressure wall
10. Side wall
11. Guiding channel
12. Intermediate wall
13. Channel
AF. Air flow
P. Aerodynamic element
M. Motor

DESCRIPTION OF SPECIFIC EMBODIMENTS OF THE INVENTION

The aerodynamic diverter (1) comprises at least one surface (2) exposed to the air flow (AF), at least one cavity (3) that is located in a way that creates an opening in the form of a recess on the surface (2), at least one inlet (4) that is located on the cavity (3) and first meets the incoming air flow (AF), at least one outlet (5) where the air flow (AF) leaves the cavity (3), and at least one aerodynamic element (P) that is located on the surface (2) and is exposed to the air flow (AF).

The aerodynamic diverter (1), which is the subject of the invention, comprises the aerodynamic element (P) that is located on the outlet (5) opposite to the inlet (4) and extends from the outlet (5) to the inlet (4), and is behind the outlet (5) relative to the direction of the air flow (AF), and at least one guiding surface (6) that allows the air flow (AF) passing over it to be transmitted to the aerodynamic element (P) and allows the air flow (AF) entering the cavity (3) from the inlet (4) to leave the cavity (3) in a way that it is directed around the aerodynamic element (P).

The surface (2) and the cavity (3) that is located on the surface (2) in a way that it will recess into the surface (2) are exposed to the air flow (AF). In the direction of the air flow (AF), the air first enters the cavity (3) from the air inlet (4). The air entering the cavity (3) leaves the cavity (3) through the outlet (5) of the cavity (3). The aerodynamic element (P) that is located on the surface (2) is also exposed to the same air flow (AF).

Figure 2:
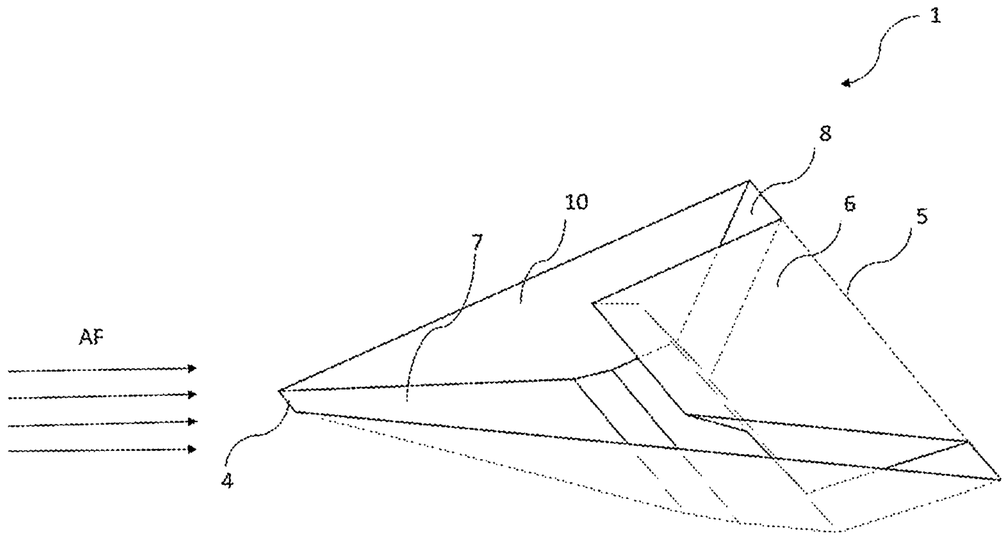
FIG. 2—Schematic view of the aerodynamic diverter.

In the boundary layer, it is desired that the low-energy air flow (AF) on the ground within the boundary layer is not transmitted to the aerodynamic element (P). The inlet (4) of the aerodynamic diverter (1) that is embedded on the surface (2) is opposite to the outlet (5) in the direction of the air flow (AF). There is a guiding surface (6) extending from the outlet (5) to the inlet (4). The relatively medium and high energy air flow (AF) passing over the guiding surface (6) is transmitted to the aerodynamic element (P). The low energy air flow (AF) entering the cavity (3) exits the cavity (3) to be directed to the sides of the aerodynamic element (P). In this way, the aerodynamic diverter (1) exposed to the boundary layer flow effectively removes the low energy air flow (AF) from the aerodynamic element (P). (FIG. 1, FIG. 2)

Optionally, the aerodynamic diverter (1) comprises at least one base (7) that forms the floor of the cavity (3), extends with an incline from the inlet (4) to the inside of the surface (2), thus allows the air flow (AF) entering from the inlet (4) to be directed between the guiding surface (6) and the outlet (5). The base (7) forms the floor of the cavity (3) by creating a slope downwards from the inlet (4) to the inside of the surface (2). In this way, the air flow (AF) flowing under the guiding surface (6) from the inlet (4) is easily discharged from the outlet (5).

Optionally, the aerodynamic diverter (1) comprises at least one rear wall (8) that extends with an incline from the base (7) towards the outlet (5), and at least one pressure wall (9) that extends with an incline from the rear wall (8) towards the guiding surface (6), thus ensures that the air flow (AF) entering from the inlet (4) is compressed between the base (7) and the guiding surface (6), creating static pressure. The rear wall (8) is positioned in a way that it will slope upwards so that the air flow (AF) effectively exits the cavity (3). There is a pressure wall (9) that extends with an incline from the intersection of the base (7) and the rear wall (8) towards the guiding surface (6), and ensures that the air flow (AF) advancing on the base (7) is compressed between the base (7) and the guiding surface (6), creating high static pressure.

Optionally, the aerodynamic diverter (1) comprises at least two side walls (10) extending from the base (7) to the surface (2) at a slope predetermined by the manufacturer, thus allowing the air flow (AF) entering from the inlet (4) to leave the cavity (3) through the outlet (5) in a manner that almost completely prevents noise generation. Between the inlet (4) and the outlet (5), there are side walls (10) positioned opposite each other in a slope from the base (7) to the surface (2). By means of the side walls (10) that are positioned in a sloping manner, the air flow (AF) entering the cavity (3) is easily directed towards the outlet (5) without generating noise.

Figure 3:
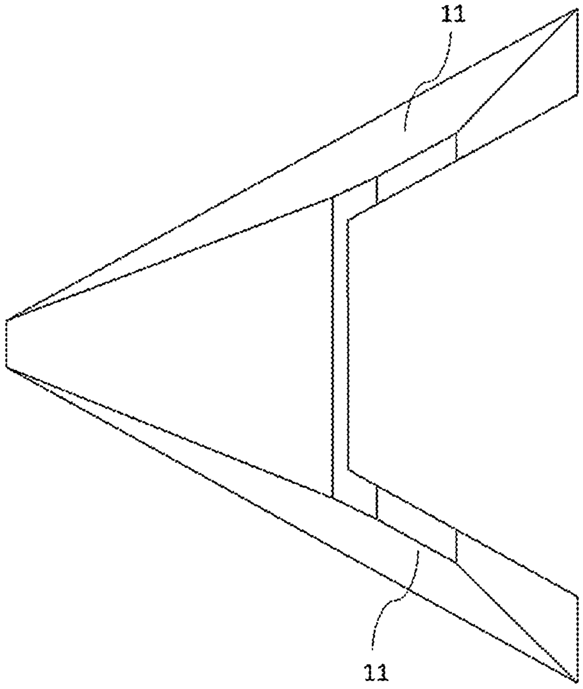
FIG. 3—Schematic view of the guiding channel.

Optionally, the aerodynamic diverter (1) comprises the guiding surface (6) that is located almost in the middle of the outlet (5), and at least two guiding channels (11) that are located between the guidance surface (6) and the side wall (10) so as to create an opening, thus allow the air flow (AF) that is directed from the inlet (4) to the bottom of the guiding surface (6) to leave the cavity (3) via the rear wall (8) and around the guidance surface (6) in an almost homogeneous distribution. The aerodynamic diverter (1) has guiding channels (11) on both sides of the guiding surface (6). The guiding channel (11) creates an opening between the guiding surface (6), the side wall (10) and the base (7). The air flow (AF) entering from the inlet (4) enters the high static pressure area under the guiding surface (6) through the downwardly inclined base (7). The air flow (AF) exits from the outlet (5) by directing to the right and left, not in the direction it entered from the inlet (4), by means of the guiding channels (11) and the upwardly inclined rear wall (8). (FIG. 3)

Optionally, the aerodynamic diverter (1) comprises an outlet (5) with a larger cross-section than the inlet (4), a guiding surface (6) that has a larger cross-section than the inlet (4) and extends towards the cavity (3) with its section narrowing from the outlet (5), allowing the air flow (AF) coming from the inlet (4) to be directed to the guiding channels (10). The inlet (4) on the aerodynamic diverter (1) has a smaller cross-section than the outlet (5). The guiding surface (6) has a larger cross-section than the inlet (4) and its cross-section narrows from the outlet (5) to the inlet (4). In this way, the air entering from the inlet (4) is easily directed to the guide channels.

Figure 4:
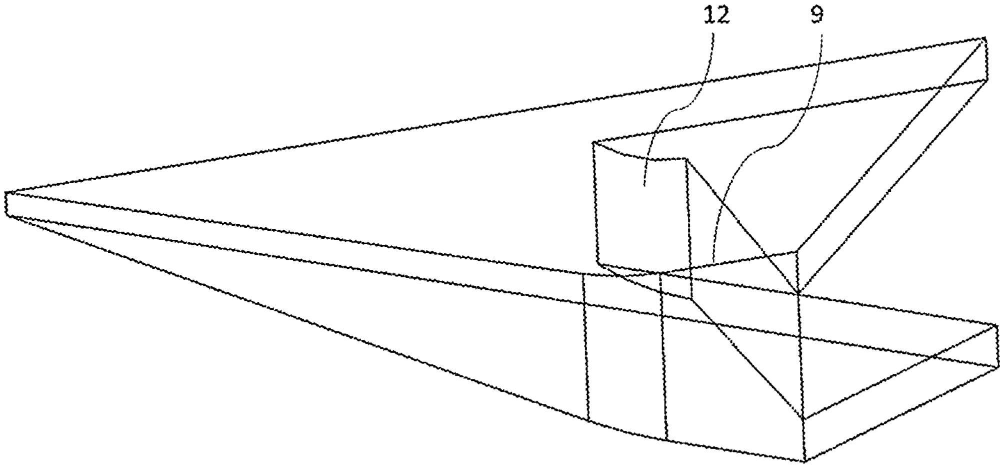
FIG. 4—Schematic view of the pressure wall and intermediate wall.

Optionally, the aerodynamic diverter (1) comprises at least one intermediate wall (12) that extends with an incline from the pressure wall (9) towards the directing surface (6), allowing the air flow (AF) entering from the inlet (4) to be directed to the guiding channels (11). The intermediate wall (12) that is located in the high static pressure region ensures that the air flow (AF) entering from the inlet (4) is transmitted to the guiding channels in a homogeneous manner, without disrupting its symmetry. (FIG. 4)

Optionally, the aerodynamic diverter (1) comprises a cavity (3) that widens from the inlet (4) to the outlet (5) and thus allows the air flow (AF) entering from the inlet (4) to be directed around the aerodynamic element (P) by means of the guiding channels (11). The cavity (3) is almost triangular in shape, widening from the inlet (4) to the outlet (5).

Optionally, the aerodynamic diverter (1) comprises a base (7) the slope of which gradually decreases under the guiding surface (6) from the inlet (4) to the rear wall (8). While the base (7) continues with a high slope from the inlet (4), it is located gradually under the guiding surface (6) in a way that its slope gradually decreases.

Optionally, the aerodynamic diverter (1) comprises a cavity (3) that is almost V-shaped when the aerodynamic element (P) is viewed from the front. When the aerodynamic diverter (1) is viewed as the inlet (4), outlet (5) and aerodynamic element (P) respectively, it is in the form of a V.

Optionally, the aerodynamic diverter (1) comprises an aerodynamic element (P) that is located on the aircraft. The aerodynamic element (P) is an air intake that is located on a wing or aircraft tested in a wind tunnel.

Optionally, the aerodynamic diverter (1) comprises a surface (2) that is the aircraft.

Optionally, the aerodynamic diverter (1) comprises at least one channel (13) forming an opening on the aerodynamic element (P), the cavity (3) that is placed at a distance from the channel (13), allows the air flow (AF) passing over it to enter the channel (13) and allows the air flow (AF) entering it to be guided around the aerodynamic element (P), and at least one motor (M) that is fed by the air flow (AF) passing through the aerodynamic element (P). The aerodynamic element (P) comprises a channel (12) into which the air flow (AF) can enter. The aerodynamic diverter (1) must be positioned in front of the channel (13) at a distance predetermined by the manufacturer for effective direction of the air flow (AF).

Figure 5:
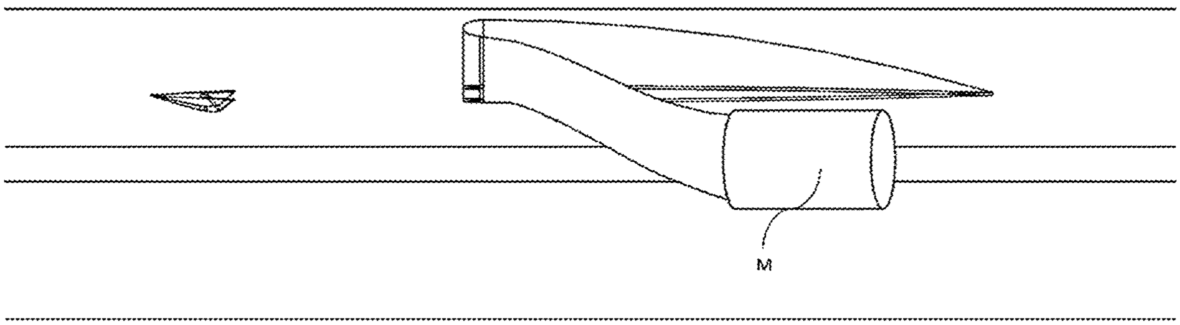
FIG. 5—Schematic view of the motor.

Optionally, the aerodynamic diverter (1) comprises the aerodynamic element (P) with the air intake, and a cavity (3) that is located by the manufacturer in front of the air intake, allowing the air flow (AF) entering the air intake from the inlet (4) to be removed from the aerodynamic element (P). The two most basic elements affecting the combustion of the motor (M) are flow rate and pressure. In order to perform the combustion of the motor (M) in the most efficient way, it is necessary to prevent low-energy air flows from entering the motor (M). The decrease in the homogeneity of the air entering the motor (M) causes the motor (M) to operate less efficiently. By means of the aerodynamic diverter (1) embedded in the surface (2), it effectively prevents the low-energy air flow (AF) from being transmitted to the air intake and therefore to the motor (M). In addition, by means of being embedded in the surface (2), it provides effective invisibility in cases where it is desired to reduce the radar cross-section. (FIG. 5).

The invention claimed is:

1. An aerodynamic diverter system for diverting a boundary layer portion of an air flow away from an air intake of an aerodynamic element disposed downstream of the aerodynamic diverter, the aerodynamic diverter comprising:

a surface exposed to the air flow, the aerodynamic element being disposed on the surface and spaced downstream of the aerodynamic diverter relative to a direction of the air flow;

a cavity recessed into the surface, the cavity defining an inlet that faces the air flow and an outlet opposite the inlet relative to the direction of the air flow, the outlet being positioned forward of the air intake of the aerodynamic element and spaced therefrom; and a guiding surface extending from the outlet toward the inlet, the guiding surface being configured such that:

(i) a first portion of the air flow passing over the guiding surface is transmitted toward the aerodynamic element, and (ii) a second portion of the air flow that enters the cavity through the inlet is directed by the guiding surface to exit the cavity through the outlet and is routed around the aerodynamic element so as to be diverted away from the air intake.

2. The aerodynamic diverter system according to claim 1, wherein the cavity includes a base defining a floor of the cavity, the base extending from the inlet into the surface at an incline predetermined by a manufacturer, whereby air flow entering the cavity through the inlet is directed between the base and the guiding surface toward the outlet.

3. The aerodynamic diverter according to claim 2, wherein the cavity further includes a rear wall extending from the base toward the outlet at an incline predetermined by the manufacturer, and a pressure wall extending from the rear wall toward the guiding surface at an incline predetermined by the manufacturer, the base, rear wall, pressure wall, and guiding surface cooperating to compress air flow entering the cavity and define a high static pressure region between the base and the guiding surface.

4. The aerodynamic diverter system according to claim 3, wherein the base has a slope that decreases from the inlet toward the rear wall.

5. The aerodynamic diverter system according to claim 2, wherein the cavity further includes two side walls, each side wall extending from the base toward the surface at an incline predetermined by the manufacturer, the two side walls being configured to direct air flow entering the cavity through the inlet to exit through the outlet with reduced noise generation relative to a cavity lacking the side walls.

6. The aerodynamic diverter system according to claim 5, wherein the guiding surface is disposed centrally across the outlet between the two side walls, and wherein the cavity further includes two guiding channels, each guiding channel defined by an opening between the guiding surface and a respective one of the two side walls, the two guiding channels being configured to distribute air flow exiting the cavity symmetrically to opposite sides of the aerodynamic element.

7. The aerodynamic diverter system according to claim 6, wherein the outlet has a cross-section larger than a cross-section of the inlet, and the guiding surface has a cross-section larger than the cross-section of the inlet and narrows from the outlet toward the cavity, so as to direct air flow from the inlet into the two guiding channels.

8. The aerodynamic diverter system according to claim 6, wherein the cavity further includes an intermediate wall extending from the pressure wall toward the guiding surface at an incline predetermined by the manufacturer, the intermediate wall being configured to direct air flow entering the cavity through the inlet into the two guiding channels.

9. The aerodynamic diverter system according to claim 6, wherein the cavity widens from the inlet to the outlet, such that air flow entering the cavity through the inlet is directed by the two guiding channels to opposite sides of the aerodynamic element.

10. The aerodynamic diverter system according to claim 1, wherein the cavity has a V shape in plan view of the surface.

11. The aerodynamic diverter system according to claim 1, wherein the surface is an outer surface of an aircraft, and the aerodynamic element is disposed on the aircraft.

12. The aerodynamic diverter system according to claim 11, further comprising a motor disposed within the aircraft and fluidly coupled to the air intake of the aerodynamic element, the motor being fed by air flow that has passed over the guiding surface and entered the air intake.

13. The aerodynamic diverter system according to claim 1, wherein the aerodynamic element comprises a channel, defining the air intake, and wherein the cavity is spaced forward of the channel by a distance predetermined by a manufacturer, such that air flow passing over the guiding surface enters the channel and air flow entering the cavity through the inlet is routed around the aerodynamic element.

* * * * *